(12) United States Patent
Ito et al.

(10) Patent No.: US 10,569,730 B2
(45) Date of Patent: Feb. 25, 2020

(54) OBJECT DETECTING APPARATUS AND OBJECT DETECTING METHOD

(71) Applicant: DENSO CORPORATION, Kariya, Aichi pref. (JP)

(72) Inventors: Yosuke Ito, Kariya (JP); Akitoshi Minemura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 165 days.

(21) Appl. No.: 15/562,373

(22) PCT Filed: Mar. 25, 2016

(86) PCT No.: PCT/JP2016/059570
§ 371 (c)(1),
(2) Date: Sep. 27, 2017

(87) PCT Pub. No.: WO2016/158726
PCT Pub. Date: Oct. 6, 2016

(65) Prior Publication Data
US 2018/0118146 A1 May 3, 2018

(30) Foreign Application Priority Data
Mar. 31, 2015 (JP) .................. 2015-072955

(51) Int. Cl.
*B60R 21/0134* (2006.01)
*B60R 21/015* (2006.01)
(Continued)

(52) U.S. Cl.
CPC .... *B60R 21/0134* (2013.01); *B60R 21/01566* (2014.10); *B60R 22/195* (2013.01);
(Continued)

(58) Field of Classification Search
None
See application file for complete search history.

(56) References Cited

U.S. PATENT DOCUMENTS

| 5,680,117 A | 10/1997 | Arai et al. |
| 8,930,063 B2 * | 1/2015 | Gandhi ................... B60R 16/02 180/128 |

(Continued)

FOREIGN PATENT DOCUMENTS

| JP | H07-140239 A | 6/1995 |
| JP | 2001076300 A | 3/2001 |

(Continued)

*Primary Examiner* — Dale W Hilgendorf
*Assistant Examiner* — Alexander Connor Larkin Bost
(74) *Attorney, Agent, or Firm* — Knobbe, Martens, Olson & Bear, LLP (57) ABSTRACT

An object detecting apparatus is provided which includes relative speed obtaining means for obtaining a relative speed of a nearby object, relative acceleration calculating means for calculating a relative acceleration of the object from the relative speed, and limiting means for setting an upper limit of the relative acceleration when a given condition where a degree of reliability of a detected value of the relative speed is expected to be low is met and then also limiting the value of the relative acceleration using the upper limit when the given condition is met. The object detecting apparatus is capable of executing a control task accurately using a value of the relative acceleration calculated based on a detected value of the relative speed.

8 Claims, 7 Drawing Sheets

(51) Int. Cl.
  *B60R 22/195* (2006.01)
  *B60T 7/22* (2006.01)
  *G01S 13/58* (2006.01)
  *G01S 13/93* (2006.01)
  *G01S 13/931* (2020.01)

(52) U.S. Cl.
  CPC ............... *B60T 7/22* (2013.01); *G01S 13/58* (2013.01); *G01S 13/931* (2013.01)

(56) References Cited

U.S. PATENT DOCUMENTS

| | | | |
|---|---|---|---|
| 9,511,751 B2 * | 12/2016 | Zagorski | G08G 1/166 |
| 9,633,565 B2 * | 4/2017 | Conrad | B60W 30/09 |
| 9,965,956 B2 * | 5/2018 | Tsushima | G08G 1/16 |
| 2001/0039472 A1 | 11/2001 | Isogai et al. | |
| 2015/0291158 A1 * | 10/2015 | Okita | B60T 8/17558 701/1 |
| 2015/0336579 A1 * | 11/2015 | Yoshizawa | B60W 30/08 701/70 |
| 2015/0346333 A1 * | 12/2015 | Soto | G01S 13/08 702/143 |

FOREIGN PATENT DOCUMENTS

| | | | |
|---|---|---|---|
| JP | 2001287568 A | 10/2001 | |
| JP | 2011121491 A | 6/2011 | |

\* cited by examiner

OBJECT DETECTING APPARATUS AND OBJECT DETECTING METHOD

TECHNICAL FIELD

The invention is generally relates to an object detecting apparatus which works to measure a relative speed to an object and calculate a relative acceleration as a function of the relative speed, and an object detecting method which is executed by such an apparatus.

BACKGROUND ART

An object detecting apparatus is known which detects a relative speed of a nearby object, calculates a relative acceleration using the relative speed, and then executes various types of control tasks based on the relative acceleration. For instance, Japanese Patent First Publication No. 2011-121491 teaches such a type of object detecting apparatus which detects a relative speed of an own vehicle to another vehicle, time-differentiates the relative speed to derive a relative acceleration, calculates a time-to-collision that is a period of time it takes for the relative distance between the own vehicle and another vehicle to reach zero, and then perform a driver-assistance task based on the time-to-collision.

SUMMARY OF THE INVENTION

Problem to be Solved by the Invention

When it is required to detect a relative speed of an object, but an unintended object has accidentally been detected, it may result in an unusual change in the relative speed. When a relative acceleration is calculated using a differential value of the relative speed, the unusual change in relative speed will result in an excessively large value of the relative acceleration. Use of such a relative acceleration to calculate the time-to-collision in the same way as in the above publication will result in a small value of the time-to-collision, which leads to a risk that start of a safety device which is actuated based on the time-to-collision may be undesirably advanced.

The present invention has been made in view of the above problem. It is a principal object to provide an object detecting apparatus which is capable of executing a control task precisely using a relative acceleration which is calculated using a detected value of relative speed.

Means for Solving the Problem

The present invention is an object detecting apparatus which comprises: relative speed obtaining means for obtaining a relative speed of a nearby object; relative acceleration calculating means for calculating a relative acceleration of said object from said relative speed; and limiting means for, when a given condition where a degree of reliability of a detected value of the relative speed is expected to be low is met, setting an upper limit for the relative acceleration and then limiting a value of the relative acceleration using the upper limit.

When a relative speed of a nearby object is detected and then differentiated to calculate a relative acceleration, and when the degree of reliability of the detected value of the relative speed is low, e.g., an error in detecting the relative speed has occurred, it may cause the calculated value of the relative acceleration to greater than an actual value. In the above structure, when the given condition where the reliability of the detected value of the relative speed is expected to be low is met, the upper limit for the relative acceleration is applied. When the value of the relative acceleration is greater than the upper limit, it is limited to the upper limit. Specifically, when the value of the relative acceleration has become greater than an actual value due to an error in detecting the relative speed, it is set to the upper limit. Alternatively, when the degree of reliability of the value of the relative speed is high, and the relative speed of the object has greatly changed, it is not necessary to limit the value of the relative acceleration. This improves the accuracy in executing a control task using such a value.

EMBODIMENTS FOR CARRYING OUT THE INVENTION

Each embodiment will be described below based on the drawings. In the following embodiments, like reference numbers refer to like parts, and explanation thereof in detail will be omitted.

First Embodiment

An object detecting apparatus of this embodiment is mounted in a vehicle (i.e., an own vehicle) and functions as part of a PCS system which works to perform control to detect a target nearby object around the own vehicle in a forward direction in which the own vehicle travels and avoid a collision with the target object or reduce damage to the own vehicle caused by such a collision.

Figure 1:
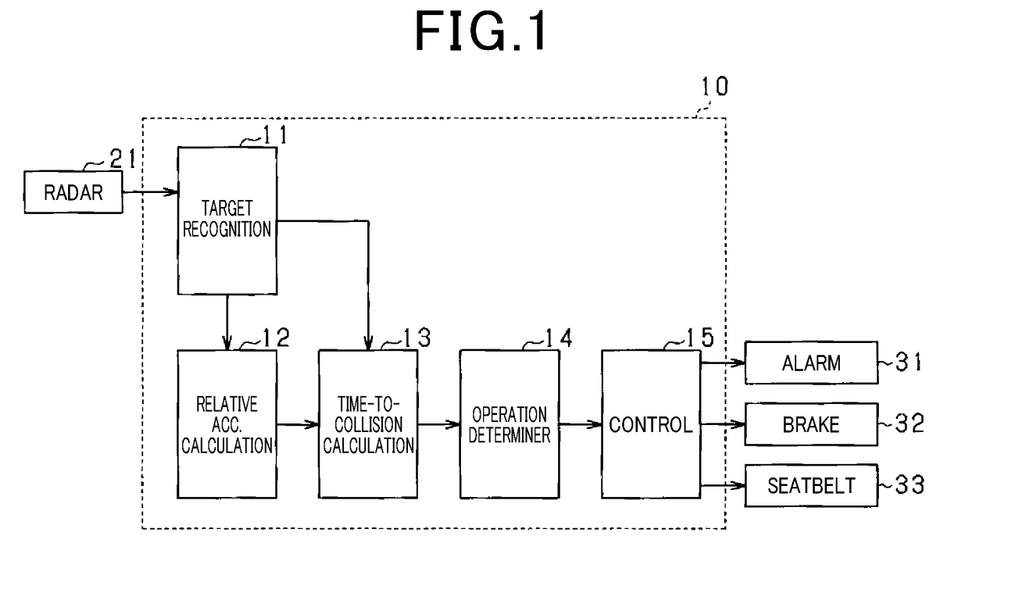
FIG. 1 is a structural view of an object detecting apparatus.

In FIG. 1, the driver-assistance ECU 10 containing the object detecting apparatus is implemented by a computer made equipped with a CPU, a ROM, a RAM, and an I/O. The driver-assistance ECU 10 performs programs, as stored in the ROM, using the CPU to achieve a variety of functions.

The driver-assistance ECU 10 has connected thereto the radar device 21 as a sensor device which inputs a various kinds of detected information to the driver-assistance ECU 10.

The radar device 21 is, for example, a known millimeter-wave radar in which a high-frequency signal in a millimeter waveband is used as a transmitted wave, arranged a front end portion of the own vehicle, has a range within a given detecting angle as a detecting range in which a target object is detectable, and determines a positon of the target object in the detecting range. Specifically, the radar device 21 transmits a probe wave in a given cycle and receive reflections or echoes thereof using a plurality of antennas. The radar device 21 calculates a distance to the target object using a transmit time of the probe wave and a reception time of the echo, determines a relative speed of the target object using a frequency changed by the Doppler effect on the echo from the target object, and also calculates an azimuth direction of the target using a phase difference of the echoes received by the antennas. A relative distance of the target object to the own vehicle is obtained by determining the positon and the azimuth direction of the target object. The radar device 21 transmits a probe wave, receives an echo, calculates a position of the echo and the relative speed, and outputs the position of the echo and the relative speed to the driver-assistance ECU 10.

The own vehicle is equipped with the warning device 31, the braking device 32, and the seatbelt device 33 as safety devices which are actuated in response to control commands from the driver-assistance ECU 10.

The warning device 31 is implemented by a speaker or display mounted in an occupant compartment of the own vehicle. When determining that there is an increased probability of collision with a target, the warning device 31 works to output an alarm sound or an alarm message to inform the driver of a collision hazard in response to the control command outputted from the driver-assistance ECU 10.

The braking device 32 is designed to apply a brake to the own vehicle. When the driver-assistance ECU 10 determines that a probability of collision with a target has become high, the braking device 32 is actuated in response to the control command from the driver-assistance ECU 10. Specifically, the braking device 32 increases the braking force, as developed by a braking operation made by the driver, (i.e., a brake assist function) or performs an automatically braking operation when the braking operation is not made by the driver (i.e., an automatic braking function).

The seatbelt device 33 is implemented by a tensioner which works to retract a seatbelt installed for each seat of the own vehicle. When the driver-assistance ECU 10 determines that a probability of collision with a target has become high, the seatbelt device 33 is actuated in response to the control command from the driver-assistance ECU 10 to perform a pre-operation to retract the seatbelt. When it is determined that it is difficult to avoid the collision, the tensioner further retracts the seatbelt to remove slack from the seatbelt to restrain a vehicle occupant, such as a driver, on the seat, thereby protecting the vehicle occupant.

The relative speed of the target object to the own vehicle and the relative distance from the target object to the own vehicle, as measured or detected by the radar device 21, are inputted to the target recognition section 11 of the driver-assistance ECU 10. The target recognition section 11 functions as distance obtaining means and relative speed obtaining means. The target recognition section 11 decomposes the obtained relative distance into a relative distance D in a longitudinal direction that is a direction of travel of the own vehicle and a relative distance in a lateral direction that is perpendicular to the direction of travel of the own vehicle and also decomposes the relative speed into a relative speed V in the longitudinal direction and a relative speed in the lateral direction.

The relative speed V is inputted to the relative acceleration calculating section 12. The relative acceleration calculating section 12 functions as relative acceleration calculating means to calculate the relative acceleration A that is a differential value of the relative speed V. Specifically, the relative acceleration A is calculated by deriving a difference between the most recently obtained relative speed V and the relative speed V, as derived in a previous control cycle, and dividing such a difference by the control cycle or period.

The calculated relative acceleration A is inputted to the time-to-collision calculating section 13. Additionally, the relative distance D and the relative speed V are inputted from the target recognition section 11 to the time-to-collision calculating section 13. The time-to-collision calculating section 13 calculates a time-to-collision TTC that is a time period required by the relative distance D between the own vehicle and the object to reach zero according to Eq. (1) below using the relative acceleration A, the relative speed V, and the relative distance D. Note that the relative speed V has a negative value when the target is approaching the own vehicle, and the relative acceleration A has a negative value when the object is accelerating toward the own vehicle.

$$TTC = \frac{-V - \sqrt{V^2 - 2AD}}{A} \quad (1)$$

In Eq. (1), the time-to-collision TTC has a negative value depending upon values of the relative acceleration A, the relative speed V, and the relative distance D. When the relative acceleration A is zero, the time-to-collision TTC is an imaginary component, or the time-to-collision TTC has a negative value, the time-to-collision TTC is derived according to Eq. (2) which does not use the relative acceleration A instead of Eq. (1).

$$TTC = -\frac{D}{V} \quad (2)$$

In Eq. (2), when the relative speed V has a positive value, that is, when the distance between the own vehicle and the object is increasing, the time-to-collision TTC will have a negative value. A given upper limit of the time-to-collision TTC is, therefore, set.

The time-to-collision TTC, as calculated by the time-to-collision calculating section 13, is inputted to the operation determining section 14. The operation determining section 14 compares the time-to-collision TTC with an operation timing of each safety device. Specifically, the operation timing of the warning device 31 is determined as the earliest timing. When the time-to-collision TTC reaches the respective operation timing, the operation determining section 14 outputs a result of the determination to the control processing section 15. The control processing section 15 outputs a command signal to the safety device.

When an object which has been detected using an output from the radar device 21 is different from that detected in a previous control cycle, but calculated locations of the objects are close to each other, they are determined to be the same object. In this case, when a difference in the relative speed V between those objects is great, the relative acceleration A which is calculated using the difference in the relative speed V will have an unusual value.

Figure 2:
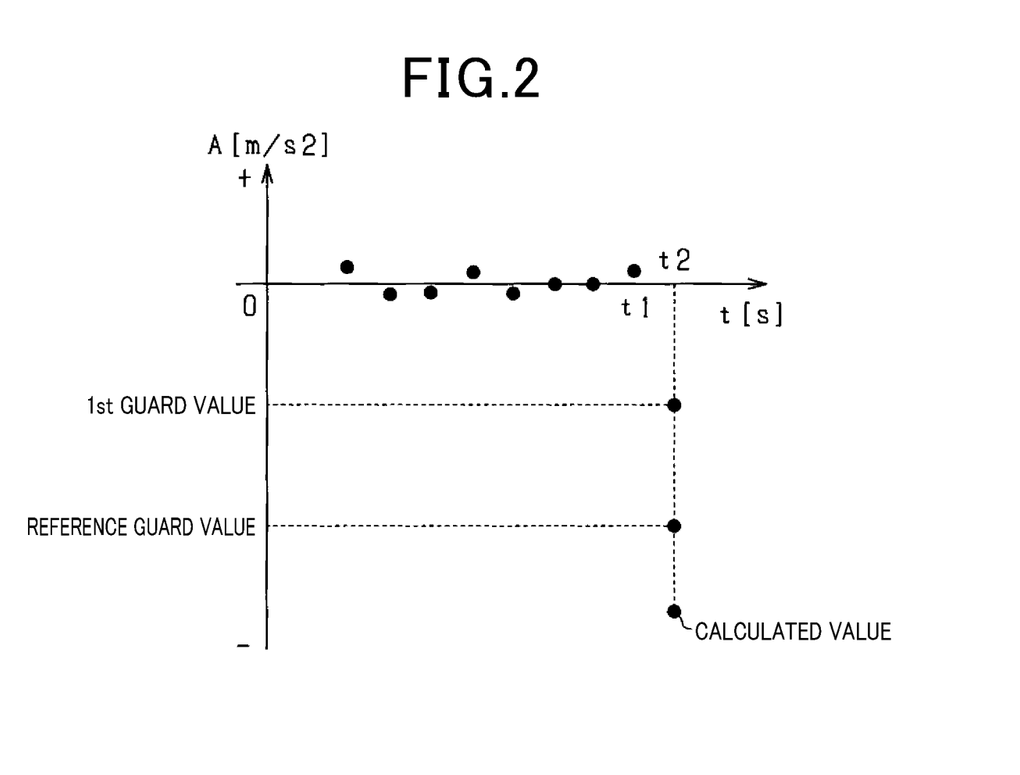
FIG. 2 is a view for explaining guard values.

Accordingly, in this embodiment, a reference guard value and a first guard value which is smaller in absolute value than the reference guard value are used as values to limit a value of the relative acceleration A. The reference guard value and the first guard value will be described below using FIG. 2. FIG. 2 represents the reference guard value and the first guard value on the negative side. The relative acceleration A is stably calculated until time t1. At time t2, an unusual negative value of the relative acceleration A which arises from an error in detecting the object is calculated. In this case, when the time-to-collision TTC is calculated according to the above Eq. (1) using the value of the relative acceleration A, it will cause the time-to-collision TTC to have a smaller value. Use of the time-to-collision TTC and the operation timing of the safety device to actuate the safety device may lead to an unnecessary operation of the safety device. In order to avoid this problem, the relative acceleration A is limited using the first guard value or the reference guard value. The relative acceleration calculating section 12 functions as a limiting means.

The first guard value is used when a given condition where a degree of reliability of a detected value of the relative speed V is expected to be low is met. When an absolute value of the relative acceleration A measured is greater than that of the first guard value, the absolute value of the relative acceleration A is limited to the first guard value. The sign of the relative speed is used before the absolute value is derived. Alternatively, when the given condition is not met, meaning that the degree of reliability of the measure value of the relative speed V is high, the value of the relative acceleration A is limited to the reference guard value. When an object is a preceding vehicle moving ahead of the own vehicle in the direction of travel of the own vehicle, and the preceding vehicle brakes suddenly, it may cause the relative acceleration A to be calculated as having a great absolute value. For instance, noise may be added to the relative acceleration A, so that it has an absolute value greater than actual. The reference guard value is, therefore, selected to be, for example, 1G, which is a realistic value expected when the preceding vehicle brakes suddenly.

In this embodiment, the determination of whether the given condition where the degree of reliability of the determined value of the relative speed V is expected to be low is met or not is achieved using a distance variation ΔD that is a difference between a detected value of the relative distance D and an estimate value Dx of the relative distance D calculated based on the relative speed V.

The estimate value Dx of the relative distance D to the object is calculated at a distance measuring interval (e.g., 50 ms) in the radar device 21 according to Eq. (3). Specifically, the estimate value Dx(i) is calculated using a value of the relative distance D and the relative speed V measured in the previous control cycle. Note that D(i−1) is a previous value of the relative distance D, V(i) is a current value of the relative speed V, V(i−1) is a previous value of the relative speed V, and tm is the distance measuring interval in the radar device 21. The distance variation ΔD(i) which indicates a deviation of the estimate value Dx(i) from the current value D(i) of the relative distance D is determined, as can be seen in Eq. (4), using the estimate value Dx(i) and the current value D(i) of the relative distance D. The distance variation ΔD(i) is compared with a threshold value to determine whether a distance variation has occurred or not. The threshold value is set much greater than an unusual value arising from the noise at the distance measuring interval. For instance, when the distance measuring interval is 50 ms, the threshold value is selected to be 0.5 to 1 m.

$$Dx(i) = D(i-1) + \frac{V(i) + V(i-1)}{2} tm \quad (3)$$

$$\Delta D(i) = |D(i) - Dx(i)| \quad (4)$$

Figure 3:
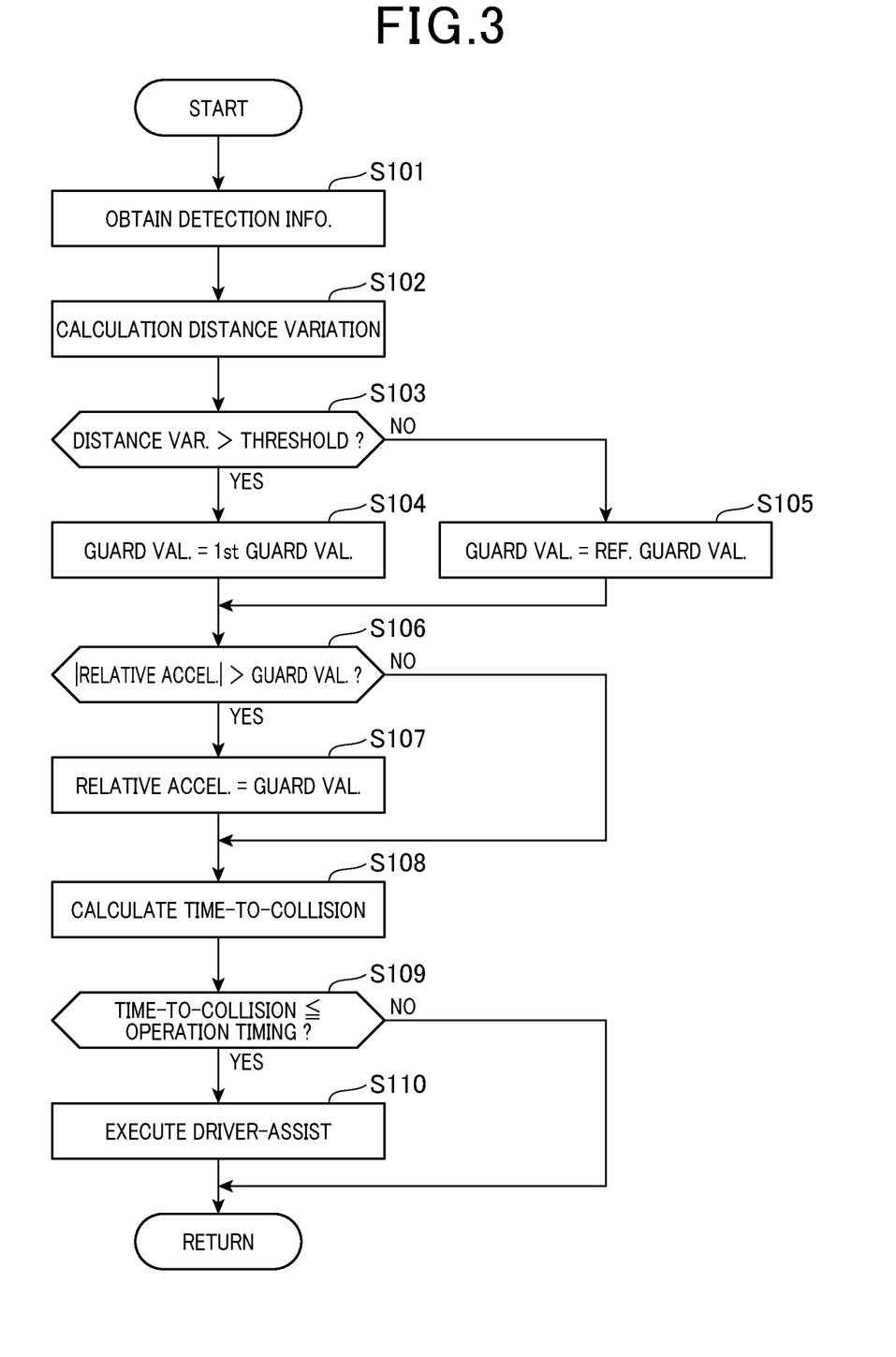
FIG. 3 is a flowchart of processing according to the first embodiment.

A processing to determine the guard value will be described using a flowchart of FIG. 3. The flowchart is executed in a given control cycle.

First, detection information is derived from the radar device 21 (S101). The distance variation ΔD(i) is calculated according to Eqs. (3) and (4) (S102). If the distance variation ΔD(i) is determined to be greater than the threshold value (YES in S103), meaning that there is a high probability that a target object, as detected, is different from that detected in the previous control cycle, the guard value is set to the first guard value (S104). Alternatively, if the distance variation ΔD(i) is determined to be lower than or equal to the threshold value (NO in step S103), meaning that there is a high probability that the target object, as detected, is identical with that detected in the previous control cycle, the guard value is set to the reference guard value (S105).

Subsequently, it is determined whether an absolute value of the relative acceleration A, as calculated based on the detection information, is greater than the guard value or not (S106). If the absolute value of the relative acceleration A is greater than the guard value (YES in S106), the value of the relative acceleration A is limited to the guard value (S107). Note that the sign of the relative acceleration A before the absolute value is derived is used in step S107. The time-to-collision TTC is then calculated according to Eq. (1) using the derived value of the relative acceleration A (S108).

After the time-to-collision TTC is derived, it is determined whether the time-to-collision TTC has reached the operation timing of the safety device or not (S109). If the time-to-collision TTC has reached the operation timing (YES in S109), the safety device is actuated to perform the drive-assistance (S110). Alternatively, if the time-to-collision TTC has not yet reached the operation timing (NO in S109), then the routine terminates.

The above structure of the object detecting apparatus of this embodiment offers the following beneficial effects.

When the condition where the degree of reliability of the value of the relative speed V is expected to be low is met, the first guard value is use for the relative acceleration A. When greater than the upper limit, the relative acceleration A is limited to the first guard value. Therefore, when the value of the relative acceleration A has become greater than an actual value due to an error in determining the relative speed V, the value of the relative acceleration A is limited. This improves the control accuracy in calculating the time-to-collision TTC using the relative acceleration A to determine whether the safety device should be actuated or not.

When the degree of reliability of the determined value of the relative speed V is high, the relative acceleration A is limited by the reference guard value which is greater than the first guard value. Therefore, when the degree of reliability of the determined value of the relative speed V is high, and the target object is subjected to a sudden braking force, the value of the relative acceleration A is not limited more than necessary. Accordingly, when the degree of reliability of the determined value of the relative speed V is high, the safety device is prevented from undesirably operating.

The fact that the distance variation ΔD(i) exceeds the threshold value means that at least one of the relative speed V and the relative distance D has not been correctly determined. It is, therefore, possible to use the distance variation ΔD(i) for determining whether the degree of reliability of the determined value of the relative speed V is high or not.

Second Embodiment

An object detecting apparatus according to this embodiment has a structure identical with that in the first embodiment as a whole, but is partially different in the processing from that in the first embodiment.

When the location of an object is determined using the radar device 21, there is a risk that an error in detecting a reflected wave fails in deriving the relative distance D and the relative speed V of the object. When the relative distance D and the relative speed V of an object have failed to be derived or radar-detected, this embodiment calculates the relative distance D and the relative speed V using values derived one or two control cycles earlier and uses such calculated values as extrapolated values instead of radar-detected values. The target recognition section 11 functions as estimating means.

Figure 4:
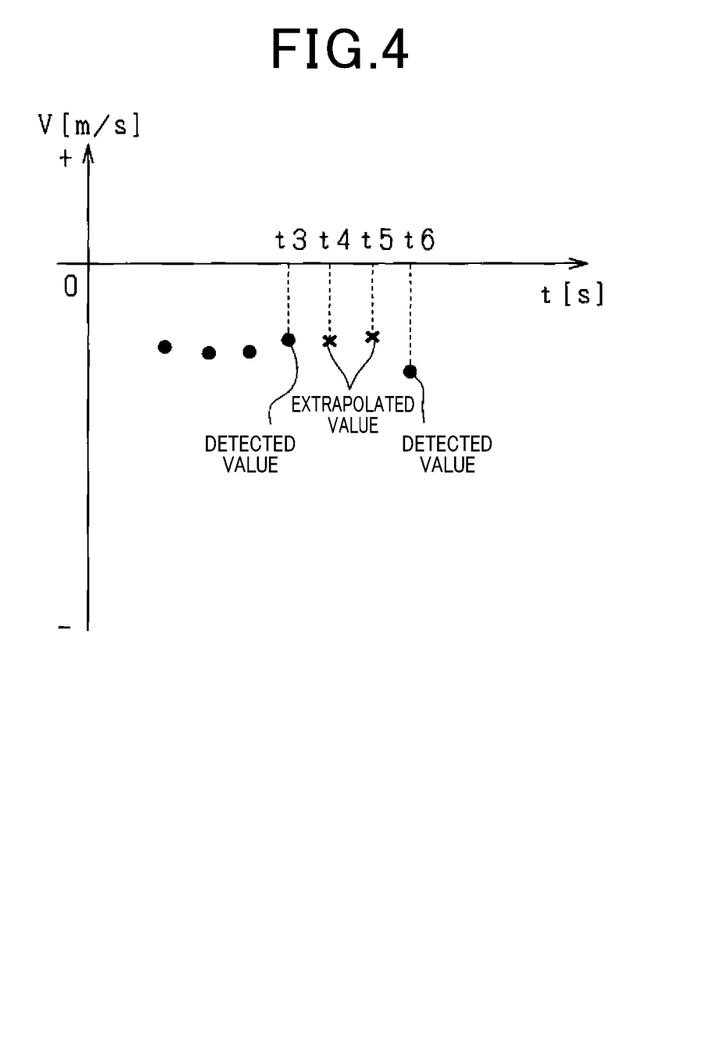
FIG. 4 is a view for explaining an extrapolated value.

The extrapolated values will be described with reference to FIG. 4. It is assumed that values of the relative distance D and the relative speed V of a target object have been detected before time t3. When the relative distance D and the relative speed V of the target object fail to be detected at time t4, extrapolated values that is values estimated using previously derived values are used as radar-detected values. The extrapolated values may be determined to be the same as values of the relative distance D and the relative speed V already derived at time t3 or alternatively be calculated using values of the relative distance D and the relative speed V at time t3 and records of values of the relative distance D and the relative speed V already derived before time t3. Specifically, a value of the relative acceleration A at time t4 is determined using a value of the relative speed V detected at time t3 and an extrapolated value of the relative speed V calculated at time t4. Similarly, the relative distance D and the relative speed V of the target object at time t5 are determined using extrapolated values. If the value of the relative speed V continues to fail to be detected for a given period of time in which extrapolation techniques should be used, it is determined that the target object has disappeared. The processing to calculate the extrapolated values is then terminated.

Subsequently, at time t6, the detection of a target object successfully resumes to derive values of the relative distance D and the relative speed V again. In this condition, a value of the relative speed V at time t5 is the same as at time t3 or calculated using a value before time t3. The degree of reliability of the value of the relative speed V at time t5 is, therefore, low. The calculation of a value of the relative acceleration A using the values of the relative speed V determined at time t5 and time t6 may result in an error in which the relative acceleration A is deviated from an actual value thereof.

Therefore, when a value determined in the previous control cycle is an extrapolated value, and there is a value detected in this control cycle, that is, when the radar device 21 has resumed correctly detecting a target object, the given condition is determined to be met. A second guard value is used as the guard value which is smaller in absolute value than the reference guard value is used as the guard value. How to determine such a guard value will be explained using a flowchart of FIG. 5. The processing of the flowchart is executed in a given control cycle.

Figure 5:
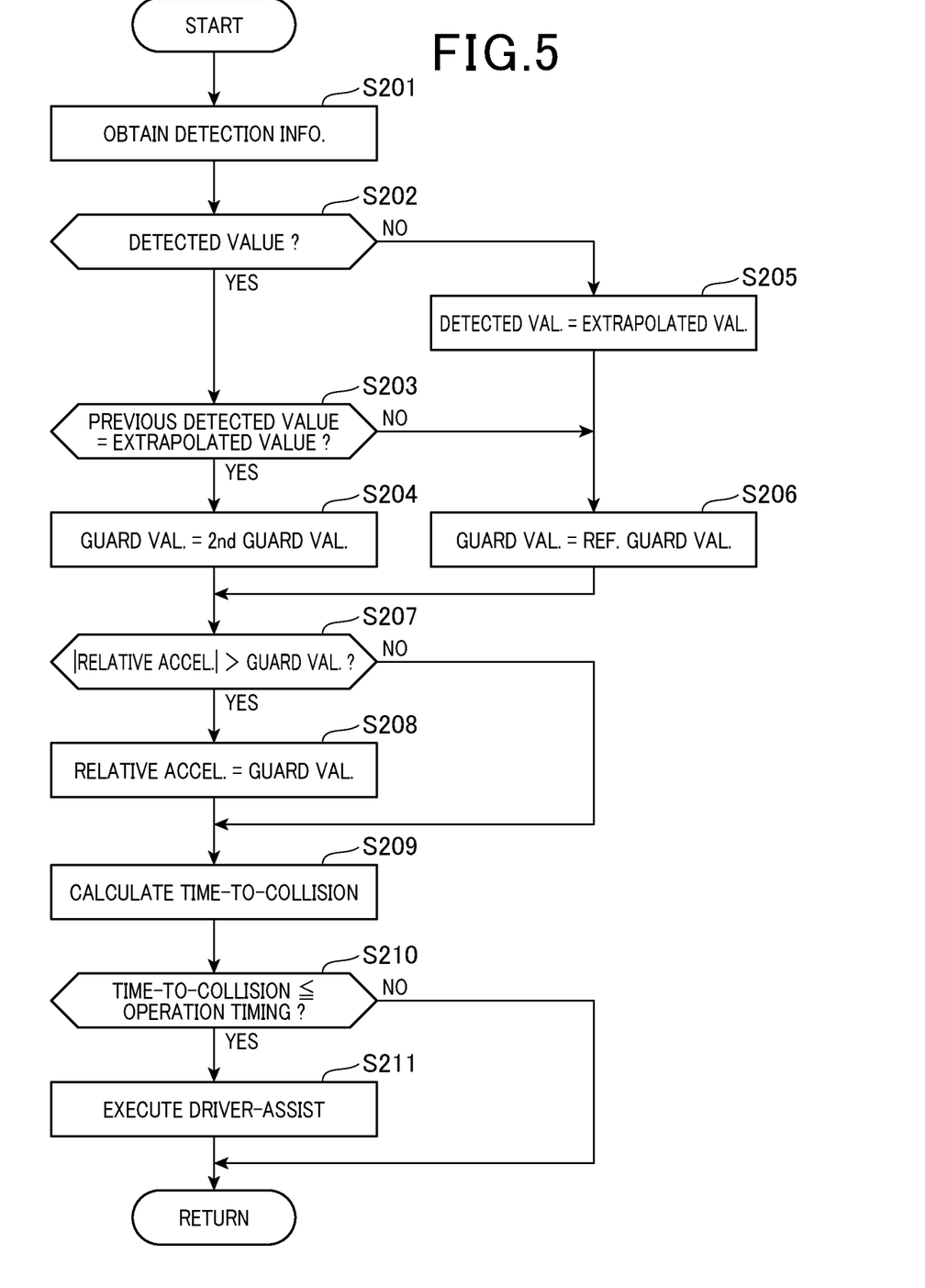
FIG. 5 is a flowchart of processing according to the second embodiment.

Information about detection executed by the radar device 21 is derived (S201). It is determined whether there is a detected value or not using the detection information (S202). If it is determined that there is the detected value (YES in S202), it is determined whether a value, as derived in the previous control cycle, is an extrapolated value or not (S203). If the previously derived value is determined to be an extrapolated value (YES in S203), the second guard value is set to the guard value (S204).

Alternatively, if there is no detected value (NO in S202), an extrapolated value is determined as the detected value (S205). The reference guard value is determined as the guard value (S206). If a detected value continues to exist for a given period of time, then the routine terminates without executing step S205. If there is a detected value (YES in S202), and the value, as derived in the previous control cycle, is not an extrapolated value (NO in S203), it means that the degree of reliability of a calculated value of the relative acceleration A is high. The reference guard value is, therefore, set to the guard value (S206).

Subsequently, it is determined whether an absolute value of the relative acceleration A, as calculated based on the detection information, is greater than the guard value or not (S207). If the absolute value of the relative acceleration A is greater than the guard value (YES in S207), the value of the relative acceleration A is limited to the guard value (S208). Note that the sign of the relative acceleration A before the absolute value is derived is used in step S208. The time-to-collision TTC is then calculated according to Eq. (1) using the derived value of the relative acceleration A (S209).

After the time-to-collision TTC is derived, it is determined whether the time-to-collision TTC has reached the operation timing of the safety device or not (S210). If the time-to-collision TTC has reached the operation timing (YES in S210), the safety device is actuated to perform the drive-assistance (S211). Alternatively, if the time-to-collision TTC has not yet reached the operation timing (NO in S210), then the routine terminates.

The above structure of the object detecting apparatus of this embodiment offers the following beneficial effects in addition to those derived in the first embodiment.

When an extrapolated value is used as the detected value, the degree of reliability thereof is usually low. In this embodiment, when actual detection of a value of the relative speed V has resumed from when an extrapolated value was used, the relative acceleration A is limited by the second guard value, thereby minimizing a risk that the relative acceleration A has an unusual value when the relative acceleration A is calculated using a value whose degree of reliability is low.

Third Embodiment

Figure 6:
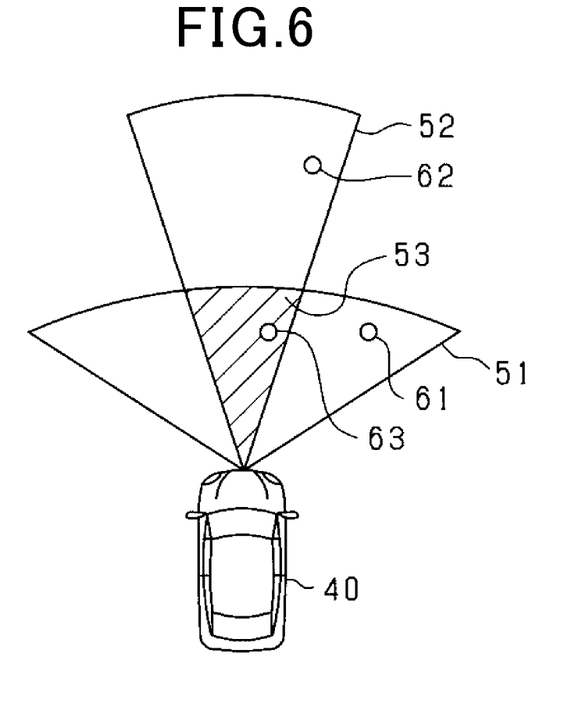
FIG. 6 is a view for explaining detectable ranges of a long range radar and a short range radar.

This embodiment uses, as the radar device 21, a long range radar and a short range radar which are different in frequency band of probe waves transmitted and in detectable range. The long range radar has an angular range in which the probe wave is transmitted and which is smaller than that of the short range radar. The long range radar has a range in which an object is detectable and which is greater than that of the short range radar. One of the long range radar and the short range radar functions as a first detecting means, while the other functions as a second detecting means.

The detectable ranges of the long rang radar and the short range radar are demonstrated in FIG. 6. The detectable range in which an object is detectable only using a short range radar wave is illustrated as a first range 51. The detectable range in which an object is detectable only using a long range radar wave is illustrated as a second range 52. The detectable range in which an object is detectable using each of the short range radar wave and the long range radar wave is illustrated as a third range 53.

When an object exists at a first location 61 within the first range 51, the location of the object is detected only by the short range radar. When an object exits at a second location 62 in the second range 52, the location of the object is detected only by the long range radar.

For example, when a condition where the location of an object is detected only by the short range radar has been changed to a condition where the location of an object is detected by both the short range radar and the long range radar, there is a probability that the detected locations result from different objects.

The target recognition section 11 is, thus, designed as a type determining means to determine one of different types of radar fusion system depending upon whether an object is being detected by both the short range radar and the long range radar, only the short range radar, or only the long range radar. If the type of radar fusion system, as determined in this control cycle, is different from that determined in the previous control cycle, the degree of reliability of a value of the relative speed V is determined to be low. A third guard value is selected as a value limiting the value of the relative acceleration A. The third guard value may be set to the same value as the first guard value used in the first embodiment or the second guard value used in the second embodiment.

Figure 7:
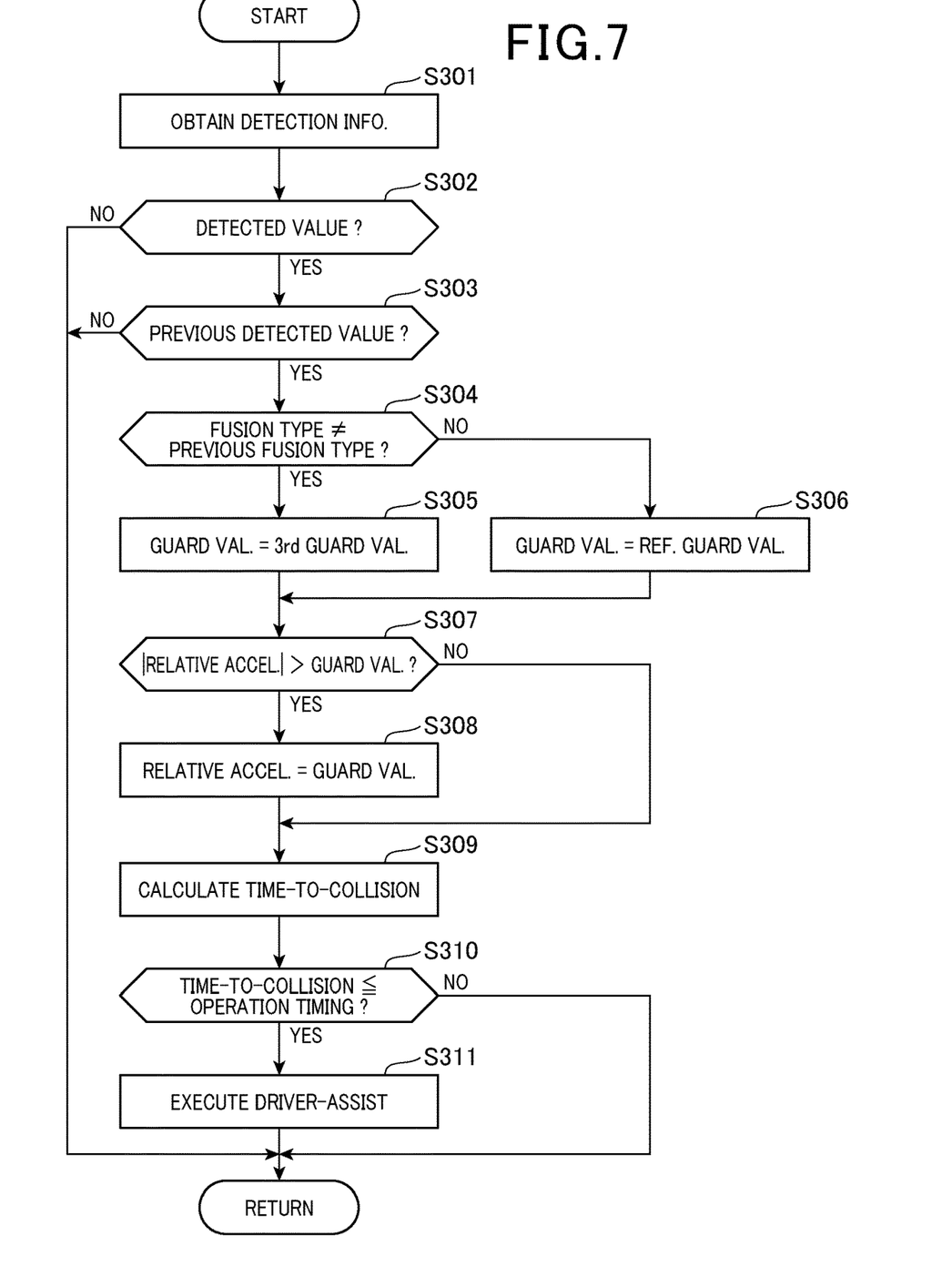
FIG. 7 is a flowchart of processing according to the third embodiment.

How to determine the guard value will be described below using a flowchart of FIG. 7. The processing of the flowchart is executed in a given control cycle.

Information about detection executed by the radar device 21 is derived (S301). It is determined whether there is a detected value or not using the detection information (S302). If it is determined that there is the detected value (YES in S302), it is determined whether there was also a detected value, as derived in the previous control cycle, or not (S303). If there was also a value derived in the previous control cycle (YES in S303), it is determined whether the type of radar fusion system which has produced the value in this control cycle is different from that in the previous control cycle or not (S304). If the type of radar fusion system in this control cycle is different from that in the previous control cycle (YES in S304), meaning that there is a high probability that an object, as detected in one control cycle earlier, is different from that detected in this control cycle, the third guard value is set as the guard value (S305). Alternatively, if the type of radar fusion system in this control cycle is identical with that in the previous control cycle (NO in S304), meaning that there is a high probability that an object, as detected in one control cycle earlier, is the same as detected in this control cycle, the reference guard value is set as the guard value (S306). If no value was detected in either the current control cycle or the previous control cycle (NO in S302, or NO in S303), then the routine terminates.

Subsequently, it is determined whether an absolute value of the relative acceleration A, as calculated based on the detection information, is greater than the guard value or not (S307). If the absolute value of the relative acceleration A is greater than the guard value (YES in S307), the value of the relative acceleration A is limited to the guard value (S308). Note that the sign of the relative acceleration A before the absolute value is derived is used in step S308. The time-to-collision TTC is then calculated according to Eq. (1) using the derived value of the relative acceleration A (S309).

After the time-to-collision TTC is derived, it is determined whether the time-to-collision TTC has reached the operation timing of the safety device or not (S310). If the time-to-collision TTC has reached the operation timing (YES in S310), the safety device is actuated to perform the drive-assistance (S311). Alternatively, if the time-to-collision TTC has not yet reached the operation timing (NO in S310), then the routine terminates.

The above structure of the object detecting apparatus of this embodiment offers the following beneficial effects in addition to those derived in the first embodiment.

When the types of radar fusion system are different from each other, it means that objects which exist at different locations have been detected in the different detectable ranges of the radar device 21. The detection of the different objects may cause a value of the relative acceleration A, as calculated using the relative speed V of the objects, to be erroneous. This embodiment determines whether the third guard value should be used or not depending upon the type of radar fusion system, thereby enhancing the accuracy in limiting the relative acceleration A.

Fourth Embodiment

An object detecting apparatus according to this embodiment has a structure identical with those in the first to third embodiments as a whole, but is partially different in the processing from those in the first to third embodiments.

Figure 8:
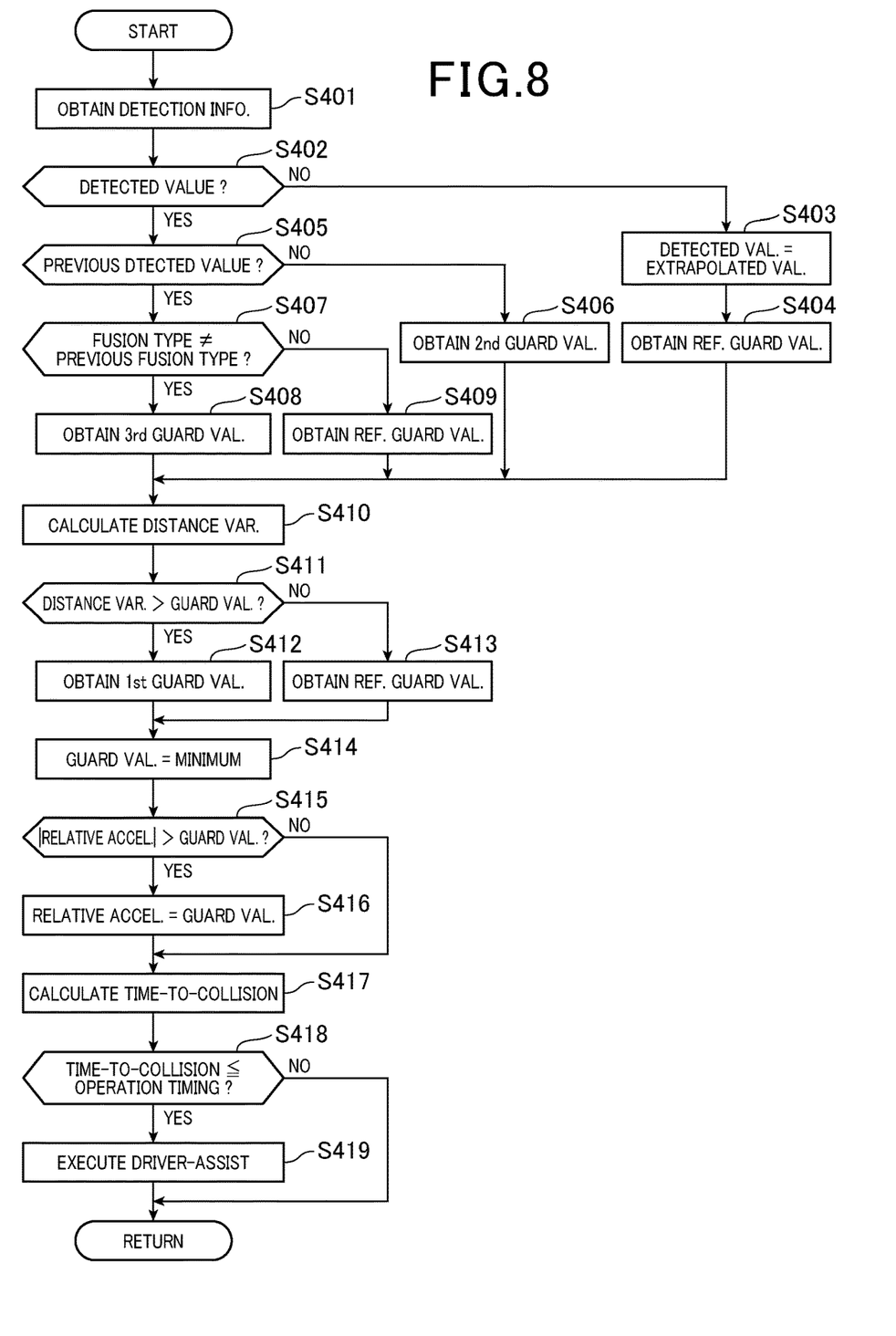
FIG. 8 is a flowchart of processing according to the fourth embodiment.

How to determine the guard value will be described below using the flowchart of FIG. 8. The processing of the flowchart is executed in a given control cycle.

Information about detection executed by the radar device 21 is derived (S401). It is determined whether there is a detected value or not using the detection information (S402). If it is determined that there is no detected value (NO in S402), an extrapolated value is, like in the second embodiment, determined as the detected value (S403). The reference guard value is derived (S404). Alternatively, if it is determined that there is a detected value (YES in S402), it is determined whether there was a value detected in the previous control cycle or not, in other words, whether an extrapolated value was not used as the detected value in the previous control cycle or not (S405). If there was no value detected in the previous control cycle (NO in S405), the second guard value is, like in the second embodiment, derived (S406).

If there was also a value detected in the previous control cycle (YES in S405), it is determined, like in the third embodiment, whether the type of radar fusion system which has produced the value in this control cycle is different from that in the previous control cycle (S407). If the type of radar fusion system in this control cycle is different from that in the previous control cycle (YES in S407), the third guard value is derived (S408). Alternatively, if the type of radar fusion system in this control cycle is identical with that in the previous control cycle (NO in S407), the reference guard value is derived (S409).

Subsequently, the distance variation $\Delta D(i)$ is, like in the first embodiment, calculated according to Eqs. (3) and (4) (S410). If there was no detected value (NO in S402) or the value derived in the previous control cycle was an extrapolated value (NO in S405), the distance variation $\Delta D(i)$ is calculated using extrapolated values. If the distance variation $\Delta D(i)$ is determined to be greater than the threshold value (YES in S411), the first guard value is derived (S412). Alternatively, if the distance variation $\Delta D(i)$ is determined to be lower than or equal to the threshold value (NO in step S411), the reference guard value is derived (S413). If no value is detected value (NO in S402) or the value derived in the previous control cycle was an extrapolated value (NO in S405), the operations in steps S410 to S413 may be omitted.

The derived guard values are compared with each other to determine the smallest one of them (S414). Specifically, when two or more of the first to third guard values have been derived, the smallest one is used as the guard value. Alternatively, when only one of the first to third guard values has been derived, it is used as the guard value. Alternatively, when only the reference guard value has been derived, it is used as the guard value.

Subsequently, it is determined whether an absolute value of the relative acceleration A, as calculated based on the detection information, is greater than the guard value or not (S415). If the absolute value of the relative acceleration A is determined to be greater than the guard value (YES in S415), the value of the relative acceleration A is limited to the guard value (S416). Note that the sign of the relative acceleration A before the absolute value was derived is used in step S416. The time-to-collision TTC is then calculated according to Eq. (1) using the derived value of the relative acceleration A (S417).

After the time-to-collision TTC is derived, it is determined whether the time-to-collision TTC has reached the operation timing of the safety device or not (S418). If the time-to-collision TTC has reached the operation timing (YES in S418), the safety device is actuated to perform the drive-assistance (S419). Alternatively, if the time-to-collision TTC has not yet reached the operation timing (NO in S418), then the routine terminates.

The above structure of the object detecting apparatus of this embodiment offers substantially the same beneficial effects as those in the first to third embodiments.

MODIFICATION

Each of the above embodiments uses the reference guard value, but however, it may be omitted.

In the first and second embodiments, the relative speed V of and the relative distance D to an object are detected by the radar device 21, but however, may alternatively be derived using an image capturing device.

Each guard value and the reference guard value are used in control to avoid a collision with an object. Therefore, when the object is moved toward the own vehicle, that is, the relative acceleration A has a negative value, the guard values and the reference guard value may be set to smaller values.

Each of the above embodiments limits the relative acceleration A to the guard value, but however, a change in the relative acceleration A may alternatively be limited using the guard value.

In the second embodiment, when actual radar-detection of a value of the relative speed V has resumed from when the relative speed V was not actually derived, so that an extrapolated value was used as the value of the relative speed V, the second guard value is used, but however, when at least one of two successive values of the relative speed V which have been time-sequentially derived is given by an extrapolated value, the second guard value may be used.

The third and fourth embodiments determine the type of the radar fusion system using the long range radar and the short range radar, but however, the own vehicle may also be equipped with an image capturing device which is different in how to detect an object from the radar device 21 to determine the type of radar fusion system depending upon whether the same object is being detected by the image capturing device and the radar device 21.

The fourth embodiment is designed to execute a combination of the operations in the first to third embodiments, however, may alternatively be engineered to execute the operations in the first to third embodiments independently from each other and then select the smallest of the guard values. The fourth embodiment may alternatively be designed based on any two of the first to third embodiments.

In each of the above embodiments, the time-to-collision TTC is calculated using the relative acceleration A, however, such calculation may be used with a function to make the own vehicle follow The above embodiments work to avoid an accidental collision with an obstacle existing in front of the own vehicle, however, are not limited to it. The above embodiments may alternatively be used with a system designed to detect an obstacle existing behind the own vehicle and avoid an accidental collision with the obstacle or a system designed to avoid an accidental collision with an obstacle moving closer to the own vehicle. "Forward or in front of in the travel direction of the vehicle", as referred to herein, means the front side of the vehicle when traveling forward, but the rear side of the vehicle when traveling backward.

The safety devices mounted in the own vehicle are not limited to those referred to in the above embodiments. For instance, a steering system which works to avoid collision with an object may be used.

The above embodiments refer to the vehicle driven by an operator or driver, but may be used with a vehicle which is automatically driven by an ECU. The object detecting apparatus may alternatively be mounted in an object other than vehicles.

The invention claimed is:

1. An object detecting apparatus comprising:
relative speed obtaining means for obtaining a relative speed of a nearby object;
relative acceleration calculating means for calculating a relative acceleration of said object from said relative speed;
limiting means for, in response to a given condition where a reliability of a detected value of said relative speed is expected to be below a first threshold value being met, setting an upper limit for said relative acceleration which does not include zero and then limiting a value of the relative acceleration using the upper limit; and
distance obtaining means for obtaining a distance to said object in a given control cycle, and wherein said given condition additionally includes a condition where a difference between a variation in the distance, as obtained by said distance obtaining means, and a variation in distance, as calculated using said relative speed exceeds a second threshold value.

2. An object detecting apparatus as set forth in claim 1, wherein in response to said condition not being met, said limiting means limits said relative acceleration using a given value, and wherein an absolute value of another upper limit is smaller than that of the given value.

3. An object detecting apparatus as set forth in claim 1, wherein said relative speed obtaining means obtains said relative speed in a given cycle which is detected by first detecting means and second detecting means which are different in at least one of a detectable range or a detection method from each other, further comprising type determining means for determining whether a type of detection system is a system where said object is detected by the first detecting means and the second detecting means or a system where said object is being detected by one of the first detecting means and the second detecting means, and wherein said given condition additionally includes a condition where the type of detection system derived by said type determining means is different from that derived in a previous control cycle.

4. An object detecting apparatus comprising:
relative speed obtaining means for obtaining a relative speed of a nearby object;

relative acceleration calculating means for calculating a relative acceleration of said object from said relative speed; and limiting means for, in response to a given condition where a reliability of a detected value of said relative speed is expected to be below a threshold value being met, setting an upper limit for said relative acceleration which does not include zero and then limiting a value of the relative acceleration using the upper limit, wherein said relative speed obtaining means obtains said relative speed in a given cycle, further comprising estimating means which, in response to said relative speed not being obtained, estimates a relative speed of said object using a value of the relative speed, as derived in a previous control cycle, and wherein said given condition additionally includes a condition where at least one of two successive values of a relative speed V in a longitudinal direction which have been time-sequentially derived is given by an estimated value.

5. An object detecting apparatus as set forth in claim 4, wherein said given condition additionally includes a condition where the relative speed has resumed to be detected from when the relative speed was estimated.

6. An object detecting apparatus as set forth in claim 4, wherein said given condition alternatively includes a plurality of conditions, wherein said upper limit is set for each of the conditions, and wherein in response to said plurality of conditions being met, said limiting means compares between the upper limits and limits said relative speed using the smallest of the upper limits.

7. An object detecting apparatus comprising:
relative speed obtaining means for obtaining a relative speed of a nearby object;
relative acceleration calculating means for calculating a relative acceleration of said object from said relative speed;

limiting means for, in response to a given condition where a reliability of a detected value of said relative speed is expected to be below a first threshold value being met, setting an upper limit for said relative acceleration and then limiting a value of the relative acceleration using the upper limit; and distance obtaining means for obtaining a distance to said object in a given control cycle, wherein said given condition additionally includes a condition where a difference between a variation in the distance, as obtained by said distance obtaining means, and a variation in distance, as calculated using said relative speed exceeds a second threshold value.

8. An object detecting apparatus comprising:
relative speed obtaining means for obtaining a relative speed of a nearby object;
relative acceleration calculating means for calculating a relative acceleration of said object from said relative speed; and limiting means for, in response to a given condition where a reliability of a detected value of said relative speed is expected to be below a threshold value being met, setting an upper limit for said relative acceleration and then limiting a value of the relative acceleration using the upper limit, wherein said relative speed obtaining means obtains said relative speed in a given cycle, further comprising estimating means which, in response to said relative speed not being obtained, estimates a relative speed of said object using a value of the relative speed, as derived in a previous control cycle, and wherein said given condition additionally includes a condition where at least one of two successive values of the relative speed which have been time-sequentially derived is given by an estimated value.

* * * * *